(12) United States Patent
Kishino et al.

(10) Patent No.: US 8,816,241 B2
(45) Date of Patent: Aug. 26, 2014

(54) LASER WELDING APPARATUS

(75) Inventors: Sachio Kishino, Hamamatsu (JP);
Manabu Kobayashi, Hamamatsu (JP)

(73) Assignee: Suzuki Motor Corporation (JP)

( * ) Notice: Subject to any disclaimer, the term of this patent is extended or adjusted under 35 U.S.C. 154(b) by 396 days.

(21) Appl. No.: 13/232,636

(22) Filed: Sep. 14, 2011

(65) Prior Publication Data

US 2012/0080413 A1    Apr. 5, 2012

(30) Foreign Application Priority Data

Oct. 1, 2010   (JP) ................................. 2010-223465

(51) Int. Cl.
*B23K 26/14*   (2014.01)
*B23K 26/20*   (2014.01)
*B23K 26/08*   (2014.01)
*B23K 26/12*   (2014.01)

(52) U.S. Cl.
CPC ............. *B23K 26/0807* (2013.01); *B23K 26/20* (2013.01); *B23K 26/12* (2013.01); *B23K 26/14* (2013.01); *B23K 26/0884* (2013.01); *B23K 26/1405* (2013.01); *B23K 26/147* (2013.01)
USPC ................. 219/121.63; 219/121.84

(58) Field of Classification Search
CPC .... B23K 26/14; B23K 26/1405; B23K 26/12; B23K 26/20
USPC ............................ 219/121.84, 121.63–121.72
See application file for complete search history.

(56) References Cited

U.S. PATENT DOCUMENTS

| | | | |
|---|---|---|---|
| 5,609,781 A | 3/1997 | Kaga et al. | |
| 6,649,866 B2 * | 11/2003 | Reichmann et al. | ..... 219/121.84 |
| 6,667,456 B2 | 12/2003 | Mukasa et al. | |
| 2002/0008090 A1 | 1/2002 | Mukasa et al. | |
| 2007/0210040 A1 | 9/2007 | Sakamoto et al. | |

FOREIGN PATENT DOCUMENTS

| | | |
|---|---|---|
| CN | 1334170 A | 2/2002 |
| DE | 102006045554 A1 | 4/2008 |

(Continued)

OTHER PUBLICATIONS

Office Action corresponding to German Patent Application No. 102011114256.1 dated Feb. 17, 2012.

(Continued)

*Primary Examiner* — Samuel M Heinrich
(74) *Attorney, Agent, or Firm* — Myers Bigel Sibley & Sajovec, P.A.

(57) ABSTRACT

Together with a scanner device, an air blower is provided above a workpiece, and the air blower exhausts air in the shape of a ring toward the workpiece, the air in a ring shape surrounding an optical axis of a laser beam emitted from the scanner device. A housing of the air blower is formed in a ring shape, a ring-shaped cavity is formed in the housing, an inner ring member is attached to an undersurface of the housing, an outer ring member is attached to an outer peripheral side of the inner ring member, and a ring-shaped exhaust port is formed between the inner ring member and the outer ring member. An exhaust direction of the air is defined by inclination of an outer-peripheral-side end surface of the inner ring member and inclination of an inner-peripheral-side end surface of the outer ring member (FIG. 2).

5 Claims, 8 Drawing Sheets

(56) References Cited

FOREIGN PATENT DOCUMENTS

| DE | 102008009832 A1 | | 8/2009 |
|----|----|----|----|
| JP | 2000225487 A | * | 8/2000 |
| JP | 20070215474 A | | 2/2007 |
| JP | 2007-268610 | | 10/2007 |
| JP | 2009291807 A | | 12/2009 |

OTHER PUBLICATIONS

First Office Action corresponding to Chinese Patent Application No. 201110302989.8 issued Nov. 6, 2013.
Second Office Action corresponding to Chinese Patent Application No. 201110302989.8 issued May 6, 2014.
Office Action corresponding to Japanese Patent Application No. 2010-223465 issued Apr. 22, 2014.

* cited by examiner

LASER WELDING APPARATUS

CROSS-RELATED APPLICATIONS

This application claims priority from Japanese Patent Application No. 2010-223465; filed Oct. 1, 2010, the disclosure of which is incorporated herein by reference in its entirety.

BACKGROUND OF THE INVENTION

The present invention relates to a laser welding apparatus for welding by use of a laser beam.

Remote laser welding has become common, in remote laser welding an object to be processes such as a workpiece is welded by remotely controlling a robot to which a laser emitting means, such as a scanner device or a laser machining head, for example, is attached. In such laser welding, a workpiece is welded by being irradiated with a laser beam from a position distant from the workpiece. Furthermore, the welding is performed on desired portions of the workpiece by remote control to move an arm of a robot or to rotate a reflecting mirror or the like provided to the laser emitting means so that different parts of the workpiece are irradiated with the laser beam.

When a workpiece made of a metal is irradiated with a laser beam for the purpose of welding, the metal vaporizes to produce a metal vapor (plume), and then the metal vapor blocks the laser beam. This results in impairment of the stability of the amount of heat applied from the laser beam to the workpiece, and results in deterioration of the welding quality. To address this, a method for welding has been heretofore adopted, in which a fan is installed at a position, for example, a position which is located distant from and at a side of a workpiece, the fan blows air (gas) on the workpiece, and therefore the metal vapor (plume) is blown away by the air.

In addition, U.S. Publication Application No. 2007/0210040 A1 discloses a laser welding apparatus having a configuration in which fumes are blown away by air ejected from an air spray nozzle, and the air spray nozzle is attached to a laser machining head attached to a tip of a robotic arm. In this laser welding apparatus, the air spray nozzle is disposed at a side of the workpiece or at a side of the laser beam, and the air is ejected in such a manner as to cross the laser beam.

BRIEF SUMMARY OF THE INVENTION

For welding a workpiece, it is often the case that the workpiece is mounted on a workbench and is pressed from above by multiple stick-shaped or plate-shaped clampers, for example. In this case, a portion of the workpiece to be welded is positioned at a recessed region defined by the multiple dampers. Therefore, the welding is performed in such a manner that the laser beam is incident from above on the recessed region defined by the clampers.

In the case of welding with the workpiece being pressed by the clampers in this manner, air which is blown on the workpiece crosswise from a fan disposed on the side of the workpiece, hits and is blocked by side surfaces of the dampers, and therefore; fails to flow into a recessed region defined by the clampers. As a result, the metal vapor (plume) remains in the recessed region defined by the dampers, and blocks the laser beam. This may impair the welding quality.

In the method of blowing the air on the workpiece crosswise from the fan installed on the side of the workpiece, the amount of air hitting a portion of the workpiece to be welded is very different between cases in which the portion of the workpiece to be welded is close to the fan and is distant from the fan. For this reason, the amount of the metal vapor (plume) remaining without being blown away by the air, is different between the cases in which the portion to be welded, is close to the fan and is distant from the fan. This may consequently cause a difference in the welding quality between the welded portions of the workpiece. In addition, depending on how the dampers are installed, air may hit the workpiece unevenly. This case as well may involve the difference in the welding quality between the welded portions of the workpiece.

In addition, the laser welding apparatus described in U.S. Publication Application No. 2007/0210040 A1, has a configuration in which the air spray nozzle is disposed on the side of the workpiece or on the side of the laser beam, and the air is ejected in such a manner as to cross the laser beam. For this reason, the laser welding apparatus described in U.S. Publication Application No. 2007/0210040 A1 may also cause a problem similar to that in a case in which the air is blown on the workpiece crosswise from the fan installed on the side of the workpiece.

On the other hand, there is also a problem in that spatter may splatter when irradiating the workpiece with a laser beam, colliding with a cover glass of a scanner device and damaging the cover glass.

The present invention is made in view of the aforementioned problems, for example, and a first object of the present invention is to provide a laser welding apparatus which is capable of achieving high-quality welding by reliably removing a metal vapor (plume) due to irradiation of an object to be processed, such as a workpiece, with a laser beam.

A second object of the present invention is to provide a laser welding apparatus that is capable of making the welding quality uniform throughout multiple welded portions of an object to be processed even when the portions are at different locations.

A third object of the present invention is to provide a laser welding apparatus that is capable of preventing splattering of a spatter occurring by irradiating an object to be processed with a laser beam.

To solve these problems, a first laser welding apparatus of the present invention includes: laser emitting means for irradiating the object to be processed with the laser beam; a supporting unit supporting the laser emitting means in such a manner that the laser emitting means is disposed above the object to be processed; gas exhaust means being supported by the supporting unit in such a manner as to be disposed above the object to be processed, and exhausting a ring-shaped gas toward the object to be processed, the ring-shaped gas surrounding an optical axis of the laser beam; and a gas supply source supplying a gas to the gas exhaust means.

The first laser welding apparatus of the present invention can blow a ring-shaped gas on the object to be processed from above the object to be processed. For this reason, even in a case in which the object to be processed is welded while being pressed by dampers, the first laser welding apparatus can blow the gas into a recessed region defined by the dampers on the object to be processed, and therefore, can blow away a metal vapor (plume) in the region. Accordingly, the first laser welding apparatus can reliably remove the metal vapor (plume) blocking the laser beam, and it can improve the welding quality.

In addition, the first laser welding apparatus can blow the ring-shaped gas on the object to be processed from above the object to be processed. For this reason, even in a case in which the object to be processed has multiple portions to be welded at different locations, the first laser welding apparatus is capable of blowing off the metal vapor (plume) by blowing the gas on all the portions. Accordingly, the first laser welding apparatus can make the welding quality uniform throughout these portions.

In addition, the gas exhaust means is supported by a supporting unit which also supports the laser emitting means. For example, in a case in which the supporting unit is a robot and the laser emitting means is supported by a tip portion of the arm of the robot, the gas exhaust means is also supported by the tip portion of the arm of the robot. As a result, when the robot is remotely controlled to move the laser emitting means so as to move the position irradiated with the laser beam, the gas exhaust means also moves following the laser emitting means. Accordingly, it is possible to always blow the gas sufficiently on the portion to be welded by the laser beam emission. Therefore, it is possible to make the welding quality uniform throughout all the portions of the object to be processed that is to be welded.

In addition, blowing the ring-shaped gas on the object to be processed from above the object to be processed enables a spatter to be blown away downward to a position distant from the object to be processed.

To solve these problems, a second laser welding apparatus of the present invention has a feature that, in the first laser welding apparatus of the present invention, the gas exhaust means includes: a housing formed in a ring shape, and supported by the supporting unit in such a manner as to surround the laser emitting means or the optical axis of the laser beam; a cavity being formed in a ring shape on an inside of the housing, and storing the gas supplied from the gas supply source; an inner ring member formed in a ring shape and attached to an undersurface side of the housing in such a manner as to surround the laser emitting means or the optical axis of the laser beam; an outer ring member being formed in a ring shape, having an inner diameter greater than an outer diameter of the inner ring member, and being attached to the undersurface side of the housing in such a manner as to be located on an outer peripheral side of the inner ring member coaxially with the inner ring member; and a ring-shaped exhaust port communicating with the cavity, and being formed between an outer-peripheral-side end surface of the inner ring member and an inner-peripheral-side end surface of the outer ring member.

The second laser welding apparatus of the present invention can produce a flow of the ring-shaped gas with a simple structure.

To solve these problems, a third laser welding apparatus of the present invention has a feature that, in the second laser welding apparatus of the present invention, the outer-peripheral-side end surface of the inner ring member is inclined in such a manner that a lower edge thereof is located closer to a center of the inner ring member than an upper edge thereof, the inner-peripheral-side end surface of the outer ring member is inclined in such a manner that a lower edge thereof is located closer to a center of the outer ring member than an upper edge thereof, and an exhaust direction of gas exhausted from the exhaust port, is defined by inclination of the outer-peripheral-side end surface of the inner ring member and inclination of the inner-peripheral-side end surface of the outer ring member.

The third laser welding apparatus of the present invention can set the exhaust direction of the gas with a simple structure. The third laser welding apparatus is capable of easily changing the exhaust direction of the gas particularly by changing the inclination of the inner-peripheral-side end surface of the outer ring member and the inclination of the outer-peripheral-side end surface of the inner ring member.

To solve these problems, a fourth laser welding apparatus of the present invention has a feature that, in any one of the second and third laser welding apparatus of the present invention, when a center of a circle being defined by the exhaust port, is set as an exhaust reference point, and a straight line passing the exhaust reference point and perpendicularly crossing the circle, is set as an exhaust axis, the exhaust direction of the gas is defined in such a manner that a gas focus point is set at a position which is on the exhaust axis and is distant downward from the exhaust reference point by a distance being shorter than half a focus distance of the laser beam, and the gas exhausted from the exhaust port is focused on the gas focus point.

According to the fourth laser welding apparatus of the invention, the gas exhausted from the exhaust port of the gas exhaust means, is once focused at the gas focus point, flows downward while being gradually dispersed, and is then blown on the object to be processed. In this manner, the gas can be blown uniformly on a wide range of the surface of the object to be processed having a portion to be welded.

To solve these problems, a fifth laser welding apparatus of the present invention has a feature that, in any one of the second to fourth laser welding apparatus of the present invention, the inner ring member and the outer ring member are detachably attached to the housing.

In the fifth laser welding apparatus of the present invention, the inner ring member and the outer ring member can be easily replaced with another inner ring member and another outer ring member. For example, by preparing multiple inner ring members having the respective outer-peripheral-side end surfaces with different inclination angles from each other, preparing multiple outer ring members having the respective inner-peripheral-side end surfaces with different inclination angles from each other, selecting an appropriate one from among the multiple inner ring members and an appropriate one from among the multiple outer ring members, and attaching the selected inner ring member and the selected outer ring member to the housing, it is possible to set or change the exhaust direction of the gas appropriately.

To solve these problems, a sixth laser welding apparatus of the present invention has a feature that, in any one of the second to fifth laser welding apparatus of the present invention, a plurality of gas supply ports are formed on an outer peripheral side of the housing, the gas supply ports communicating with the cavity and allowing gas which is supplied from the gas supply source, to flow into the cavity, and the gas supply ports are arranged at equal intervals in a circumferential direction of the housing.

The sixth laser welding apparatus of the present invention is capable of making the flow rate of the gas exhausted from the cavity via the exhaust port uniform by supplying the gas into the cavity from the multiple gas supply ports disposed at equal intervals. In particular, the flow rate of the gas can be made uniform, even when the capacity of the cavity is small. Accordingly, it is possible to blow the gas uniformly on all portions of the object to be processed that is to be welded, and therefore, it is possible to blow away the metal vapor (plume). Thereby, uniform welding quality can be achieved all over the portions.

According to the present invention, it is possible to reliably remove the metal vapor (plume) due to the irradiation of the object to be processed with the laser beam, and therefore, it is possible to improve the welding quality. In addition, even in a case in which the object to be processed has multiple portions to be welded at different locations, the present invention can make the welding quality uniform throughout the portions. In addition, the present invention is capable of suppressing the splattering of spatter due to irradiation of the object to be processed with the laser beam.

DETAILED DESCRIPTION OF THE INVENTION

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All patents, patent applications, and publications referred to herein are incorporated by reference in their entireties.

Figure 1:
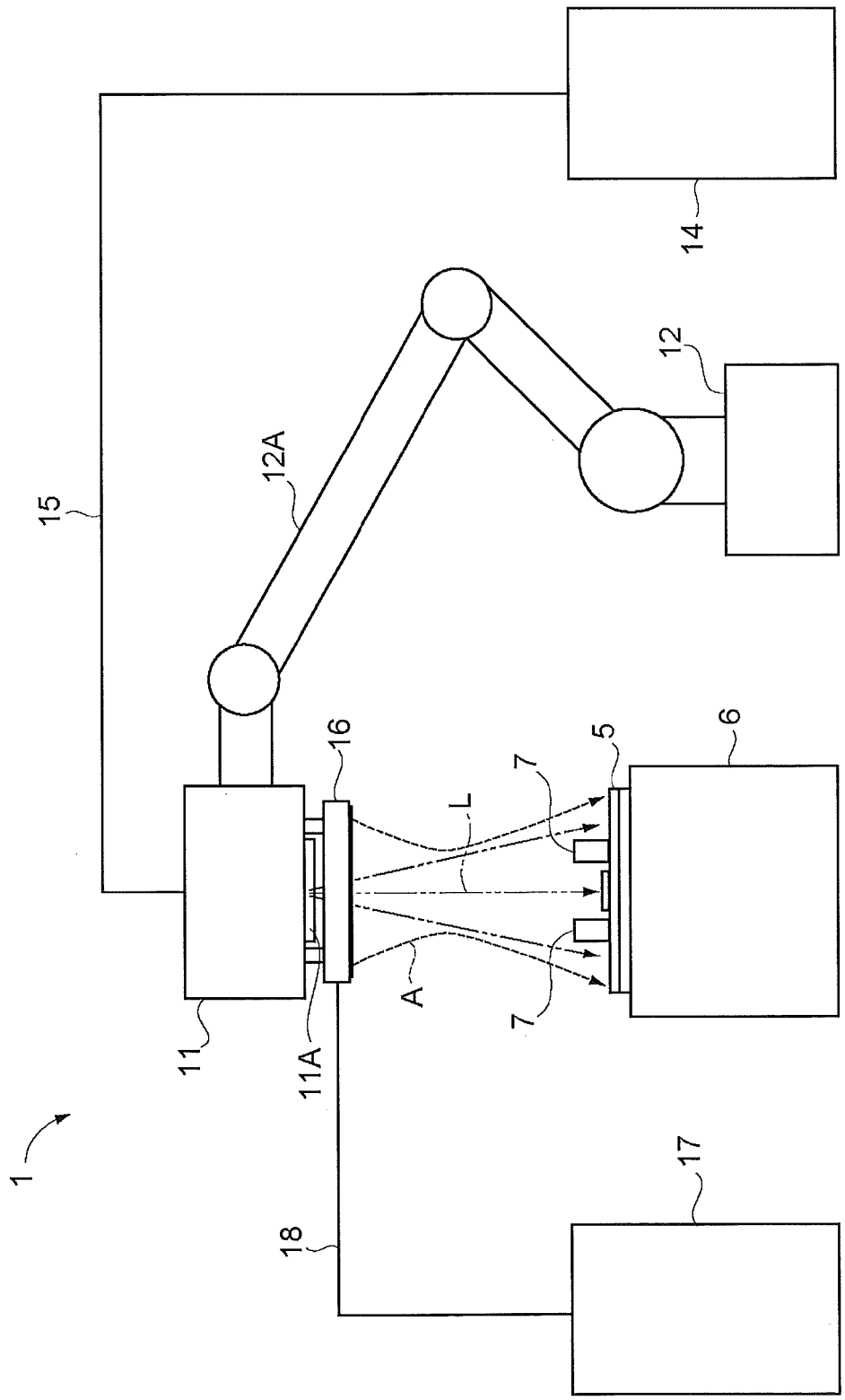
FIG. 1 is a diagram illustrating an entire laser welding apparatus according to an embodiment of the present invention.

FIG. 1 illustrates a laser welding apparatus according to an embodiment of the present invention. In FIG. 1, the laser welding apparatus 1 according to an embodiment of the present invention, is an apparatus for welding an object to be processed by irradiating the object to be processed with a laser beam. A workpiece 5 serving as an object to be processed, is mounted on a workbench 6. The workpiece 5 is pressed against the workbench 6 by multiple clampers 7.

The laser welding apparatus 1 includes a scanner device 11 serving as a laser emitting means, a robot 12, a laser oscillator 14, an air blower 16 serving as gas exhaust means, and an air source 17 serving as a gas supply source. The scanner device 11 is attached to a tip portion of an arm 12A of the robot 12. The laser oscillator 14 is connected to the scanner device 11 via an optical fiber 15.

In addition, the scanner device 11 is disposed by the robot 12 above the workpiece 5 pressed against the workbench 6 by the dampers 7. A laser beam oscillated by the laser oscillator 14, is supplied to the scanner device 11 via the optical fiber 15, the laser beam is condensed by an optical instrument (not illustrated) provided to the scanner device 11, and the laser beam is incident on the workpiece 5 from the scanner device 11. A cover glass 11A is attached to an undersurface of the scanner device 11 such that the cover glass 11A protects the optical instrument provided to the scanner device 11 from being hit by spatter.

A welding operator moves the arm 12A of the robot 12 by remote control so as to move the scanner device 11, or moves the optical instrument provided to the scanner device 11 by remote control. This enables changing of the position which is to be irradiated with the laser beam emitted from the scanner device 11. For example, moving the optical instrument provided to the scanner device 11 by remote control can change a direction of an optical axis L of the laser beam. By moving the position which is to be irradiated with the laser beam in this manner, it is possible to weld multiple portions of the workpiece 5 even when the workpiece 5 is fixed to the workbench 6.

In addition, an air blower 16 is a device which blows air A on and around a portion of the workpiece 5 to be welded, and therefore; blows away the metal vapor (plume) and the spatter occurring due to the emission of the laser beam on the workpiece 5. The air blower 16 is supported by a lower portion of the scanner device 11, and is disposed above the workpiece 5 mounted on the workbench 6. In addition, the air blower 16 has a ring-shaped outline, as will be described later, and is disposed in such a manner as to surround the optical axis L of the laser beam emitted from the scanner device 11.

In addition, the air source 17 is connected to the air blower 16 via an air supply tube 18, and supplies air to the air blower 16. The air blower 16 receives air supply from the air source 17, and exhausts a ring-shaped air A toward the workpiece 5, the ring-shaped air A surrounding the optical axis L of the laser beam.

Figure 2:
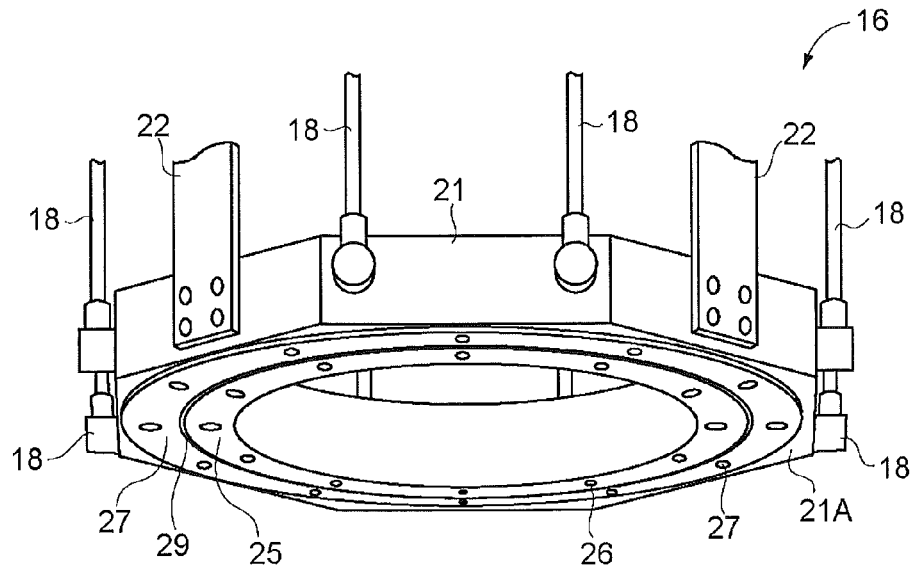
FIG. 2 is a perspective view illustrating an air blower of the laser welding apparatus according to the embodiment of the present invention.
Figure 3:
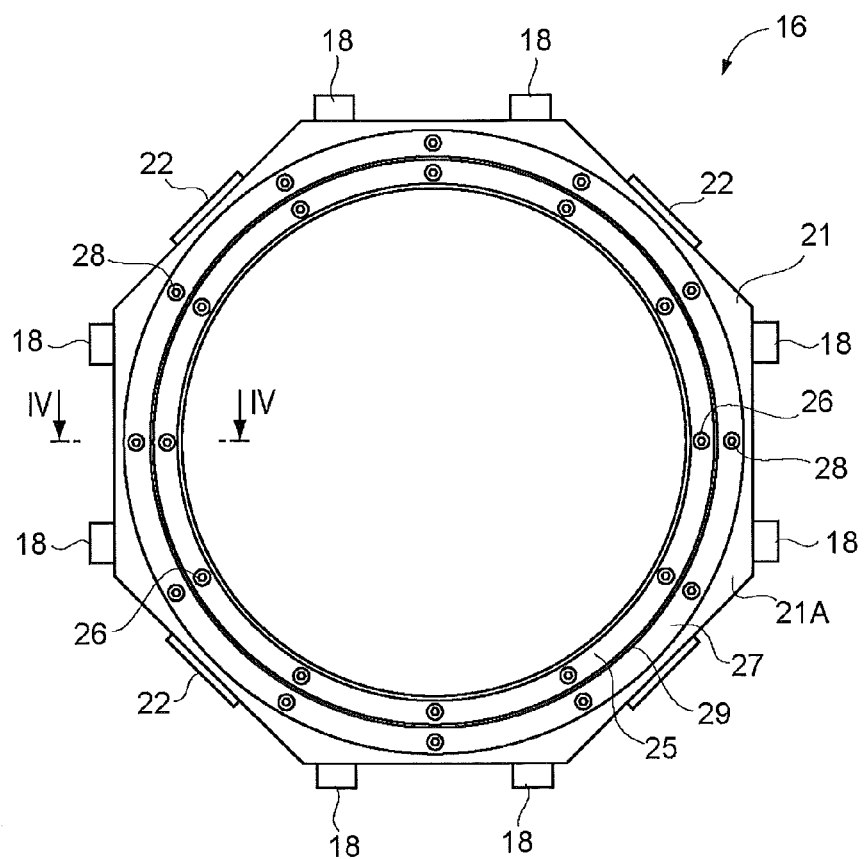
FIG. 3 is a bottom view illustrating the air blower of the laser welding apparatus according to the embodiment of the present invention.
Figure 4:
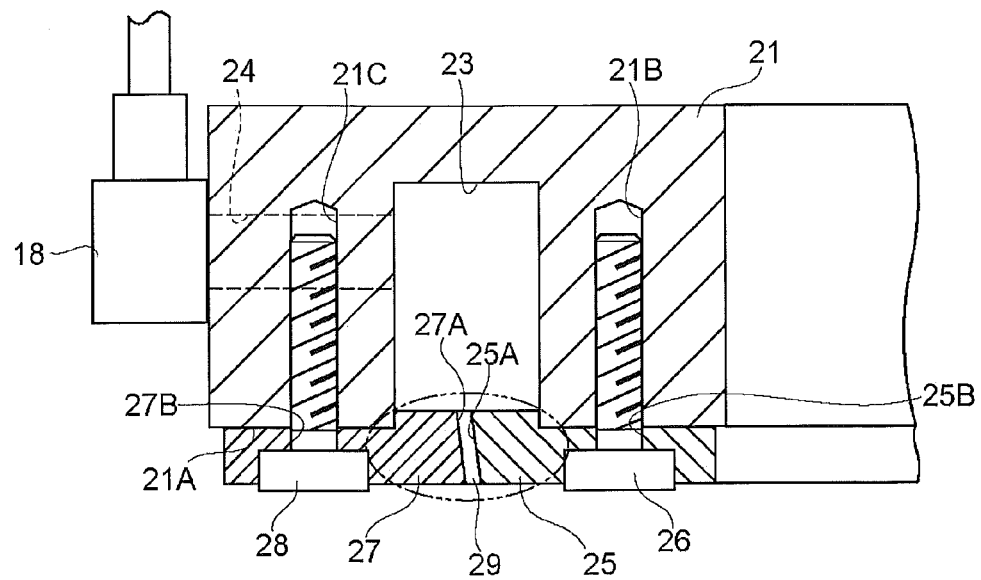
FIG. 4 is a cross-sectional view illustrating the air blower when seen from the IV-IV direction as indicated by an arrow in FIG. 3.
Figure 5:
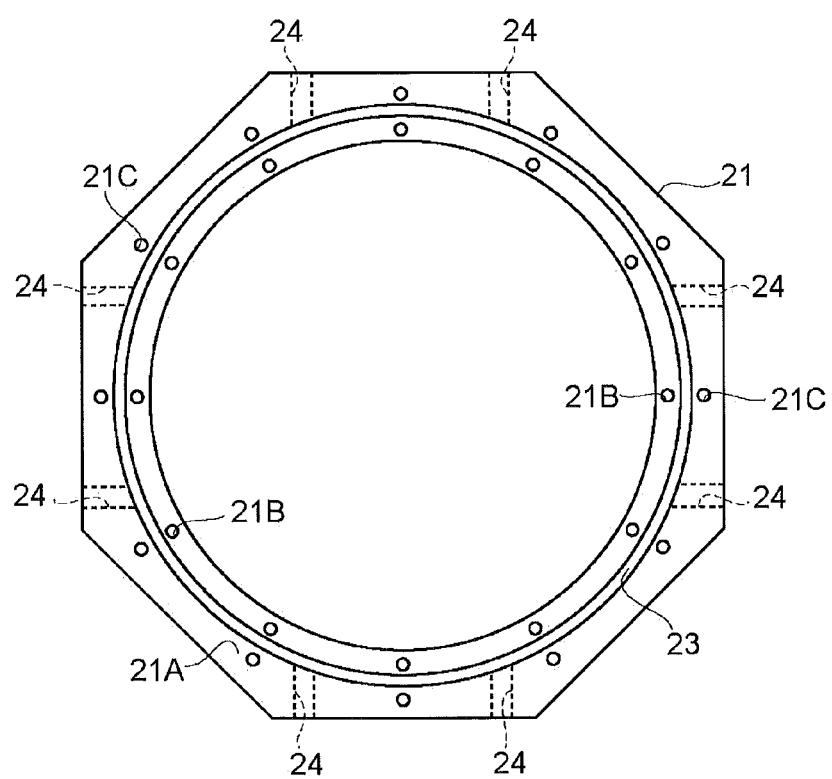
FIG. 5 is a bottom view illustrating a housing of the air blower of the laser welding apparatus according to an embodiment of the present invention.
Figure 6:
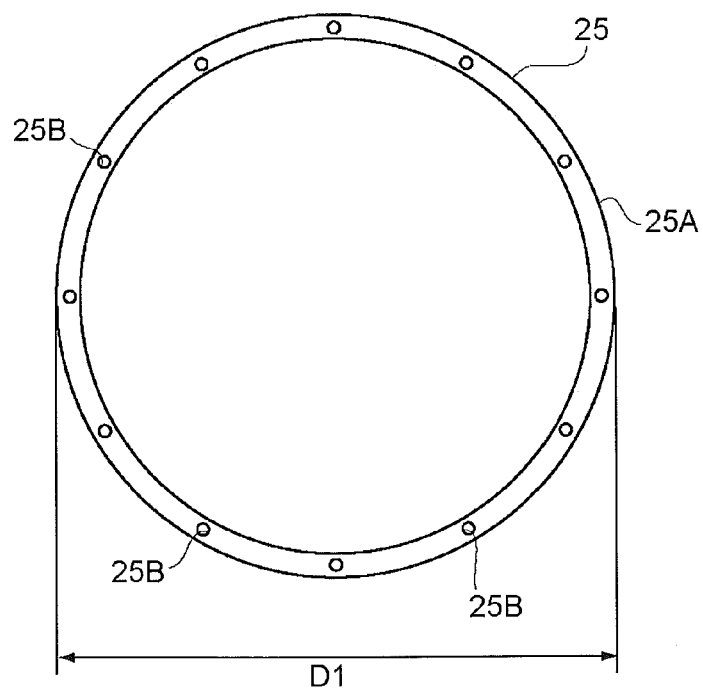
FIG. 6 is a bottom view illustrating an inner ring member of the air blower of the laser welding apparatus according to an embodiment of the present invention.
Figure 7:
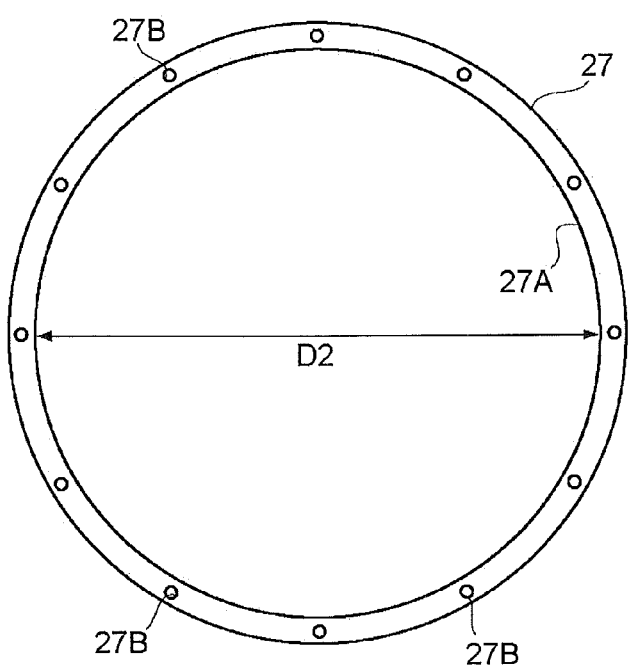
FIG. 7 is a bottom view illustrating an outer ring member of the air blower of the laser welding apparatus according to an embodiment of the present invention.

FIG. 2, FIG. 3, and FIG. 4 each illustrate the air blower 16. FIG. 5, FIG. 6, and FIG. 7 illustrate a housing, an inner ring member, and an outer ring member of the air blower 16, respectively. As illustrated in FIG. 2, the air blower 16 mainly includes a housing 21, an inner ring member 25, and an outer ring member 27.

The housing 21 is made of a material such as a metal or a heat-resistant resin, for example, and is formed in a ring shape. Multiple attachment members 22 are attached to an outer-peripheral-side surface of the housing 21, and therefore, the housing 21 is attached to the lower portion of the scanner device 11 via the attachment members 22 in such a manner as to surround the optical axis L of the laser beam.

On the other hand, as illustrated in FIG. 5, a ring-shaped cavity 23 is formed on an inside of the housing 21 in such a shape that follows the ring-shaped outline of the housing 21. The cavity 23 is open in an undersurface 21A of the housing 21, and an opening portion of the cavity 23, is formed in a ring shape along the shape of the cavity 23.

On the outer-peripheral-side surface of the housing 21, four pairs of air supply ports 24 are formed, and each of the air supply ports 24 communicates with the cavity 23. On the other hand, as illustrated in FIG. 2, the air supply tube 18 is connected to the air supply ports 24. Accordingly, air supplied from the air source 17 through the air supply tube 18, flows into the cavity 23 via the air supply ports 24, and is temporarily stored in the cavity 23. Note that although not illustrated in detail, the air supply tube 18 has one end side connected to the air source 17, and has the other end side divided into multiple pipes respectively connected to the air supply ports 24.

In addition, the four pairs of air supply ports 24 are arranged in such a manner as to be distant from each other at equal intervals (e.g., a 90 degree interval) in a circumferential direction of the housing 21. This arrangement allows air to flow into the cavity 23 simultaneously from multiple directions (four directions, for example) that different from each other. This enables air A which is exhausted from the cavity 23 via the exhaust port 29, to flow at a uniform rate. Even in a case of an embodiment in which the cavity 23 has a small capacity, in particular, the air A exhausted from the exhaust port 29 is allowed to flow at a uniform rate. Accordingly, it is possible to blow the air A uniformly throughout all the multiple portions of the workpiece 5 to be welded and therefore to blow away metal vapor (plume). Accordingly, it is possible to make the welding quality uniform throughout these portions.

As illustrated in FIG. 6, the inner ring member 25 is made of a material such as a metal or a heat-resistant resin, for example, and is formed into a ring-shaped plate. As illustrated in FIG. 3, the inner ring member 25 is detachably attached by use of screws 26 to an inner periphery portion of the undersurface 21A of the housing 21. In particular, as illustrated in FIG. 6, multiple small bores 25B are formed in the inner ring member 25 throughout the entire circumference at predetermined intervals. On the other hand, as illustrated in FIG. 5, multiple screw holes 21B are formed in an inner peripheral portion of the undersurface 21A of the housing 21 in such a manner as to correspond to the small bores 25B formed in the inner ring member 25. Attachment of the inner ring member 25 to the inner peripheral portion of the undersurface 21A of the housing 21 is made by screwing the screws 26 respectively into screw holes 21B of the housing 21 via the small bores 25B of the inner ring member 25. With this attachment of the inner ring member 25 to the inner peripheral portion of the undersurface 21A of the housing 21, the inner ring member 25 is arranged in such a manner as to surround the optical axis L of the laser beam. In addition, as illustrated in FIG. 3, the outer peripheral portion of the inner ring member 25 covers the inner peripheral portion of the opening portion of the cavity 23 which opens in the undersurface 21A of the housing 21.

As illustrated in FIG. 7, the outer ring member 27 is made of a material such as a metal or a heat-resistant resin, for example, and is formed into a ring-shaped plate. As illustrated in FIG. 3, the outer ring member 27 is detachably attached by use of screws 28 to an outer periphery portion of the undersurface 21A of the housing 21. In particular, as illustrated in FIG. 7, multiple small bores 27B are formed in the outer ring member 27 throughout the entire circumference at predetermined intervals. On the other hand, as illustrated in FIG. 5, multiple screw holes 21C are formed in an outer peripheral portion of the undersurface 21A of the housing 21 in such a manner as to correspond to the small bores 27B formed in the outer ring member 27. Attachment of the outer ring member 27 to the outer peripheral portion of the undersurface 21A of the housing 21 is made by screwing the screws 28 respectively into screw holes 21C of the housing 21 via the small bores 27B of the outer ring member 27. With this attachment of the outer ring member 27 to the outer peripheral portion of the undersurface 21A of the housing 21, the outer ring member 27 is arranged on the outer peripheral side of the inner ring member 25 in such a manner as to surround the optical axis L of the laser beam and be coaxial with the inner ring member 25. In addition, as illustrated in FIG. 3, the inner peripheral portion of the outer ring member 27 covers the outer peripheral portion of the opening portion of the cavity 23 which opens in the undersurface 21A of the housing 21.

In a state in which the inner ring member 25 and the outer ring member 27 are attached to the undersurface 21A of the housing 21, the ring-shaped exhaust port 29 which communicates with the cavity 23, is formed between an outer-peripheral-side end surface 25A of the inner ring member 25 and an inner-peripheral-side end surface 27A of the outer ring member 27. To put this differently, inner diameter D2 (see FIG. 7) of the outer ring member 27 is greater than an outer diameter D1 (see FIG. 6) of the inner ring member 25, and therefore, a ring-shaped gap is formed between the outer-peripheral-side end surface 25A of the inner ring member 25 and the inner-peripheral-side end surface 27A of the outer ring member 27. The ring-shaped gap is disposed at a position corresponding to the opening portion of the ring-shaped cavity 23, and communicates with the cavity 23. Accordingly, the ring-shaped gap functions as the exhaust port 29 through which air supplied to the cavity 23 is exhausted.

As illustrated in FIG. 4, the outer-peripheral-side end surface 25A of the inner ring member 25 which defines the exhaust port 29 is inclined in such a manner that a lower edge thereof is located closer to the center of the inner ring member 25 than an upper edge thereof. In addition, the inner-peripheral-side end surface 27A of the outer ring member 27 which defines the exhaust port 29 is inclined in such a manner that a lower edge thereof is located closer to the center of the outer ring member 27 than an upper edge thereof. With the inclination of the outer-peripheral-side end surface 25A of the inner ring member 25 and the inclination of the inner-peripheral-side end surface 27A of the outer ring member 27, an exhaust direction of the air A exhausted from the exhaust port 29, is defined. How to set the exhaust direction of the air A will be described later.

In this respect, the air blower 16 is capable of changing the exhaust direction of the air A exhausted from the exhaust port 29 by exchanging the inner ring member 25 and the outer ring member 27 for another inner ring member and another outer ring member.

Figure 8A:
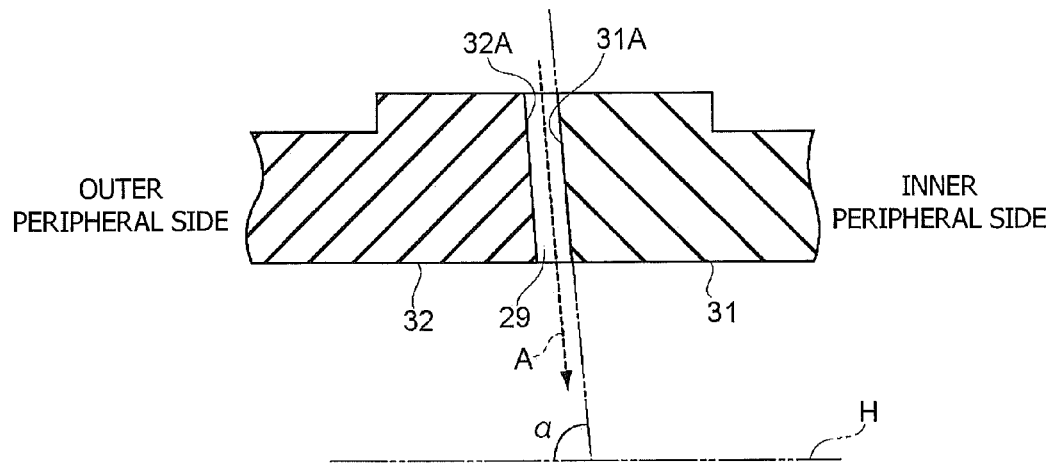
FIGS. 8A and 8B are cross-sectional views illustrating a portion of another inner ring member of the air blower and a portion of another outer ring member of the air blower.

For example, the inner ring member 31 in FIG. 8A has the outer-peripheral-side end surface inclined more steeply than the outer-peripheral-side end surface of the inner ring member 25 (see a portion surrounded by a chain double-dashed line in FIG. 4) (inclination angle α with respect to horizontal plane H is large). In addition, the outer ring member 32 in FIG. 8A has the inner-peripheral-side end surface inclined more steeply than the inner-peripheral-side end surface of the outer ring member 27 (see the portion surrounded by a chain double-dashed line in FIG. 4). The inner ring member 25 and the outer ring member 27 are detached from the housing 21, and then the inner ring member 31 and the outer ring member 32 is attached to the housing 21 instead so that the exhaust direction of the air A exhausted from the exhaust port 29, can be made closer to a direction vertical to the horizontal plane H than the exhaust direction of the air A exhausted from the exhaust port 29 which is formed by attaching the inner ring member 25 and the outer ring member 27 to the housing 21.

Figure 8B:
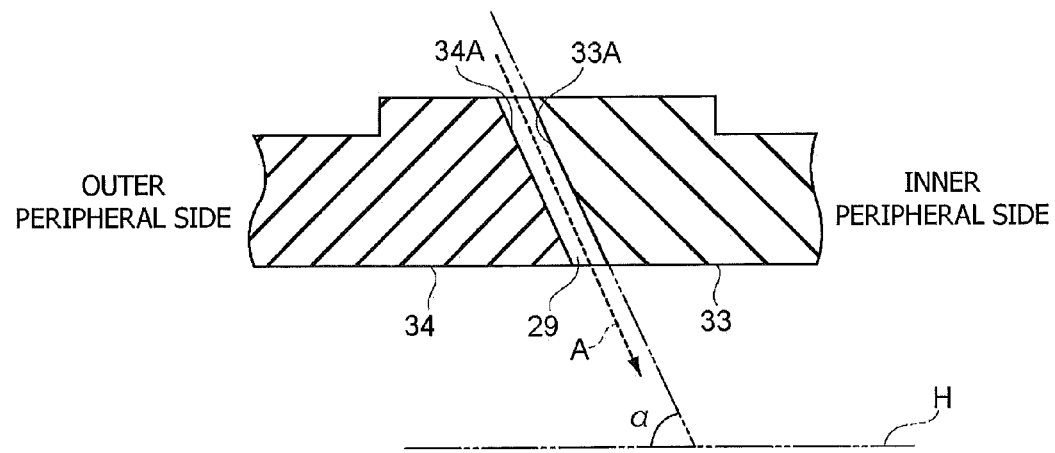

The inner ring member 33 in FIG. 8B has the outer-peripheral-side end surface inclined more gently than the outer-peripheral-side end surface of the inner ring member 25 (see FIG. 4) (inclination angle α with respect to horizontal plane H is small). In addition, the outer ring member 34 in FIG. 8B has the inner-peripheral-side end surface inclined more gently than the inner-peripheral-side end surface of the outer ring member 27 (see FIG. 4). The inner ring member 25 and the outer ring member 27 are detached from the housing 21, and then the inner ring member 33 and the outer ring member 34 are attached to the housing 21 instead so that the exhaust direction of the air A exhausted from the exhaust port 29, can be made closer to a horizontal direction than the exhaust direction of the air A exhausted from the exhaust port 29 which is formed by attaching the inner ring member 25 and the outer ring member 27 to the housing 21.

The inner ring members 25, 31 and 33, and the outer ring members 27, 32 and 34, can be easily detached from the housing 21 by detaching the screws 26 and 28. Therefore, the exchange operation of the inner ring members 25, 31 and 33, and the outer ring members 27, 32 and 34, is carried out easily. The exhaust direction of the air A exhausted from the exhaust port 29 can be easily changed by exchanging among the inner ring members 25, 31 and 33, and among the outer ring members 27, 32 and 34.

Figure 9:
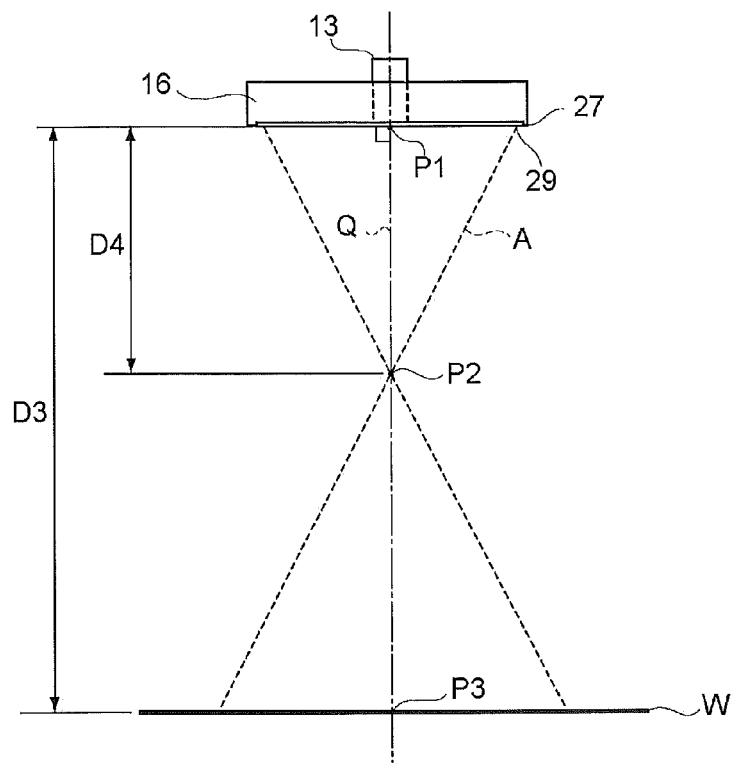
FIG. 9 is an explanatory drawing illustrating a method of setting an air exhaust direction in the air blower of the laser welding apparatus according to an embodiment of the present invention.
Figure 10:
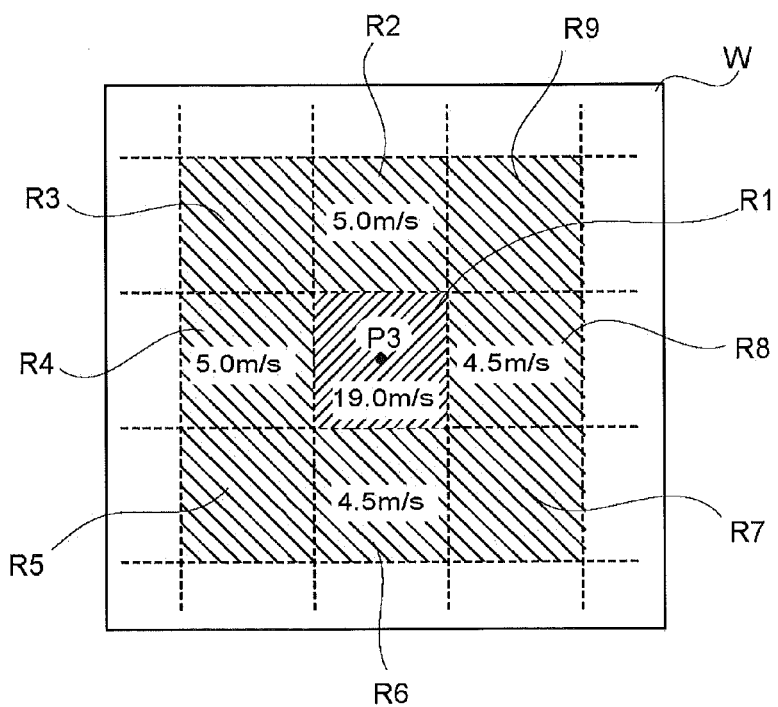
FIG. 10 is an explanatory drawing illustrating distribution of air blown on a surface of the workpiece from the air blower of the laser welding apparatus according to an embodiment of the present invention.

FIG. 9 illustrates a method of setting the exhaust direction of the air A in the air blower 16, and FIG. 10 illustrates distribution of the air A which the air blower 16 blows on the surface of the workpiece. It is desirable to set the exhaust direction of the air A in the air blower 16 in the following manner. In particular, as illustrated in FIG. 9, a surface W of the workpiece is set to be a flat surface, a focus distance D3 of the laser beam emitted from a laser emitter 13 of the scanner device, is set at 600 mm, and therefore the laser emitter 13 is disposed at a portion distant from the surface W of the workpiece by 600 mm. In addition, the air blower 16 is disposed in such a manner that the exhaust port 29 is distant from the surface W of the workpiece by 600 mm.

In such an ideal setting state, it is assumed that the center of a circle defined by the ring-shaped exhaust port 29, is set as an exhaust reference point P1, and a straight line passing the exhaust reference point P1 and perpendicularly crossing the circle, is set as an exhaust axis Q. In this case, the exhaust direction of the air A in the air blower 16, is preferably set in such a manner that an air focus point P2 is set at a position which is on the exhaust axis Q and is distant downward from the exhaust reference point P1 by a distance D4 being shorter than half the focus distance D3 of the laser beam, and the air A exhausted from the exhaust port 29 is focused on the air focus point P2.

The exhaust direction of the air A in this manner is set so that the air A is exhausted from the exhaust port 29, is once focused at the air focus point P2, flows downward while being gradually dispersed, and is then blown on the workpiece. In this manner, the air A can be blown uniformly on a wide range of the surface W of the workpiece. In particular, as illustrated in FIG. 10, the flow rate of the air A blown on the surface W of the workpiece, becomes equal across regions R2 to R9 which are each distant by approximately 100 mm in the horizontal direction from a point P3 at which the exhaust axis Q and the surface W cross each other, and the flow late is an appropriate value (e.g., when the flow rate in a center region R1 is 19.0 m/s, the flow rate in the surrounding regions R2 to R9 is 4.5 m/s to 5.0 m/s).

As will be understood from the comparison between FIG. 9 which illustrates the ideal setting state of a laser welding apparatus and FIG. 1 which illustrates an actual setting state of the laser welding apparatus 1, in the actual setting state, the air blower 16 is disposed lower than the scanner device 11 and the exhaust port 29, is located lower than the laser emitter 13 of the scanner device 11. However, it is possible in the actual setting state illustrated in FIG. 1 to set the distribution of the air A blown on the surface of the workpiece 5 appropriately as illustrated in FIG. 10, by setting the exhaust direction of the air A in the air blower 16 in such a manner that a distance between the exhaust reference point and the air focus point, is shorter than the distance D4 between the exhaust reference point P1 and the air focus point P2 in the ideal setting state illustrated in FIG. 9.

In practice, there may arise a need to adjust the distribution of the air A blown on the surface of the workpiece 5 depending on the height of the workpiece 5 or an irregular shape of the surface of the workpiece 5. All that has to be done for this adjustment is to change the exhaust direction of the air A by replacing the inner ring member 25 and the outer ring member 27 for another inner ring member 31, 33, or the like and another outer ring member 32, 34, or the like, as described above.

As has been described thus far, the laser welding apparatus 1 according to the embodiment of the present invention can blow the ring-shaped air A on the workpiece 5 from above the workpiece 5. Accordingly, even in a case in which the workpiece 5 is welded while being pressed by the dampers 7, it is possible to blow the air A into the recessed region defined by the dampers 7 on the workpiece 5 and therefore to blow away the metal vapor (plume) in the region to the outside. Accordingly, it is possible to remove the metal vapor (plume) which would block the laser beam and therefore to improve the welding quality.

In addition, according to the laser welding apparatus 1, blowing the ring-shaped air A on the workpiece 5 from above the workpiece 5, enables the spatter to be blown away downward to a position distant from the workpiece 5. This makes it possible to prevent the cover glass 11A of the scanner device 11 from being damaged due to being hit by spatter against the cover glass 11A.

Figure 11:
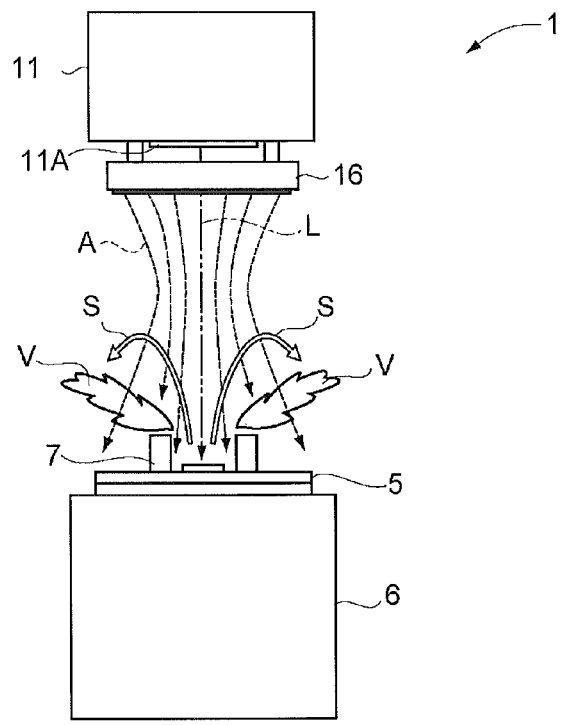
FIG. 11 is an explanatory diagram illustrating a state where air is blown on the workpiece from the air blower of the laser welding apparatus according to an embodiment of the present invention.
Figure 12:
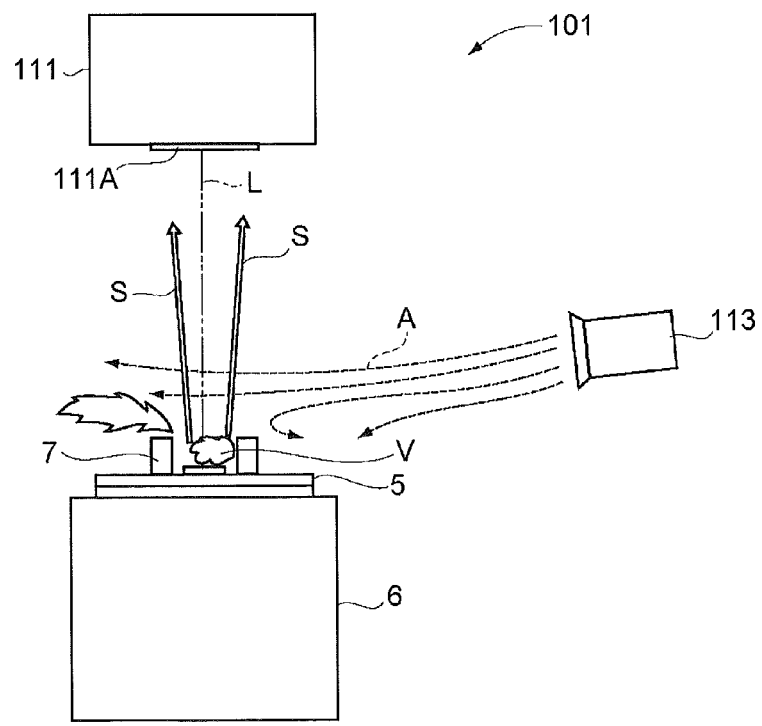
FIG. 12 is an explanatory diagram illustrating a state in which air is blown on the workpiece in a laser welding apparatus according to a comparative example.

Here, according to FIG. 11 and FIG. 12, operational effects of the laser welding apparatus 1 will be described concretely. FIG. 11 illustrates a state in which air is blown on the metal vapor (plume) or the like in the laser welding apparatus 1 according to the embodiment of the present invention. FIG. 12 illustrates a state in which air is blown at the metal vapor (plume) or the like in a laser welding apparatus according to a comparative example.

According to a laser welding apparatus 101 of the comparative example, as illustrated in FIG. 12, a fan 113 is disposed at the side of the workpiece 5, and the fan 113 blows air A on the workpiece 5 from the side of the workpiece 5. Therefore, the air A does not flow into a recessed region defined by the dampers 7 on the workpiece 5, and as a result, a metal vapor (plume) V remains in the region. The remaining metal vapor (plume) V blocks the emission of the laser beam emitted from a scanner device 111, and therefore, it can be a cause of impaired welding quality. In addition, in the laser welding apparatus 101, a cover glass 111A of the scanner device 111 may be damaged by the spatter S colliding against the cover glass 111 A.

On the other hand, in the laser welding apparatus 1 according to the embodiment of the present invention, as illustrated in FIG. 11, the air A exhausted toward the workpiece 5 from above the workpiece 5, flows into a recessed region defined by the clampers 7 on the workpiece 5, and the metal vapor (plume) V in the region is blown out of the region by the air A. As a result, the workpiece 5 is fully irradiated with the laser beam being in a stable state, and therefore, high-quality welding is achieved. In addition, in the laser welding apparatus 1, the spatter S is blown off downward to a position distant from the workpiece 5 by the air A exhausted toward the workpiece 5 from above the workpiece 5. As a result, the collision of the spatter S against the cover glass 11A of the scanner device 11 is significantly reduced.

Furthermore, the laser welding apparatus 1 according to the embodiment of the present invention can achieve the following operational effects. The ring-shaped air A can be blown on the work piece 5 from above the work piece 5. For this reason, even in a case in which the work piece 5 has multiple portions to be welded at positions different from each other, the metal vapor (plume) can be blown away by blowing the air A on all the portions. Accordingly, the welding quality can be made uniform throughout these portions.

Furthermore, the scanner device 11 and the air blower 16 are supported by a tip portion of the arm 12A of the robot 12. As a result, when the robot 12 is remotely controlled to move the scanner device 11 and to move the position irradiated with the laser beam, the air blower 16 also moves following the scanner device 11. Accordingly, it is possible to always blow the air A sufficiently on the portion to be welded by the laser beam emission. Therefore, it is possible to make the welding quality uniform throughout all the portions of the work piece 5 to be welded.

Figure 13:
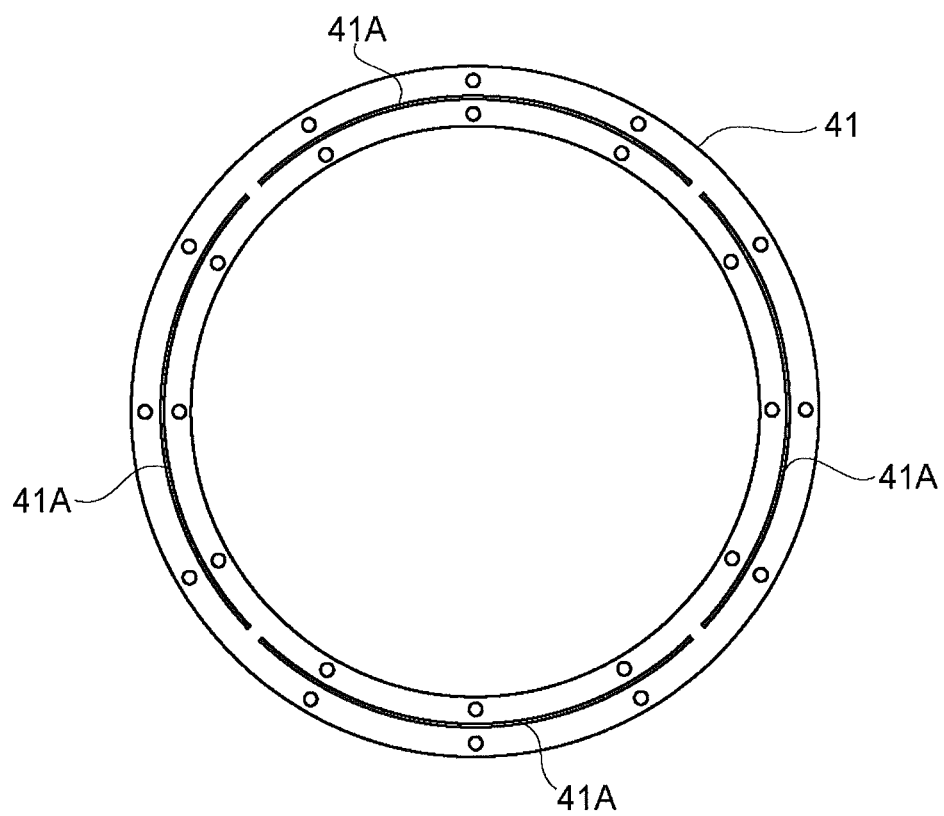
FIG. 13 is a bottom view illustrating a ring member usable in place of the inner ring member and the outer ring member according to an embodiment of the present invention.

The above embodiment is described by taking, as an example, a case in which the air blower 16 has the ring-shaped exhaust port 29 formed between the inner ring member 25 and the outer ring member 27 by arranging the outer ring member 27 on the outer peripheral side of the inner ring member 25, but the present invention is not limited to this case. For example, as illustrated in FIG. 13, in place of the inner ring member 25 and the outer ring member 27, it is possible to use a single ring member 41 in which arc-shaped slits 41A are formed. For example, formation of the arc-shaped long slits 41A in a circumferential direction with narrow intervals, enables formation of a substantially ring-shaped slit overall, and thereby a ring-shaped exhaust port is obtained.

In addition, the above embodiment is described by taking, as an example, a case in which the air blower 16 is supported by the scanner device 11, but the present invention is not limited to this. The air blower 16 may be supported by a portion of the arm 12A of the robot 12. Alternatively, the scanner device 11 and the air blower 16 may be supported not by the robot 12, but by a pole, a base, or the like, or may be hung from a high position.

Furthermore, the above embodiment is described by taking, as an example, a case in which the air blower 16 exhausts air toward the workpiece 5, but other gases may be used instead of air. Furthermore, it is also possible to provide a flow rate adjustment valve or the like between the air source 17 and the air blower 16, for example, to adjust the amount of air to be supplied from the air source 17 to the air blower 16, so that the flow rate of the air A exhausted from the exhaust port 29 can be changed.

In addition, the present invention can be changed appropriately within the scope of claims and within a scope which does not depart from the spirit or the concept of the invention readable from the specification, and laser welding apparatuses involving such changes can also be included in the technical idea of the present invention.

What is claimed is:

1. A laser welding apparatus for welding an object to be processed by irradiating the object to be processed with a laser beam, the laser welding apparatus comprising:
    laser emitting means for irradiating the object to be processed with the laser beam;
    a supporting unit supporting the laser emitting means in such a manner that the laser emitting means is disposed above the object to be processed;
    gas exhaust means being supported by the supporting unit in such a manner as to be disposed above the object to be processed, and exhausting a gas in a ring shape toward the object to be processed, the gas in a ring shape surrounding an optical axis of the laser beam;
    a gas supply source supplying a gas to the gas exhaust means;
    wherein the gas exhaust means comprises:
    a housing formed in a ring shape and supported by the supporting unit in such a manner as to surround the laser emitting means or the optical axis of the laser beam;
    a cavity being formed in a ring shape on an inside of the housing, and storing the gas supplied from the gas supply source;
    an inner ring member formed in a ring shape and attached to an undersurface side of the housing in such a manner as to surround the laser emitting means or the optical axis of the laser beam;
    an outer ring member being formed in a ring shape, having an inner diameter larger than an outer diameter of the inner ring member, and being attached to the undersurface side of the housing in such a manner as to be located on an outer peripheral side of the inner ring member coaxially with the inner ring member; and
    a ring-shaped exhaust port communicating with the cavity and being formed between an outer-peripheral-side end surface of the inner ring member and an inner-peripheral-side end surface of the outer ring member.

2. A laser welding apparatus according to claim 1, wherein
    the outer-peripheral-side end surface of the inner ring member is inclined in such a manner that a lower edge thereof is located closer to a center of the inner ring member than an upper edge thereof,
    the inner-peripheral-side end surface of the outer ring member is inclined in such a manner that a lower edge thereof is located closer to a center of the outer ring member than an upper edge thereof, and
    an exhaust direction of gas exhausted from the exhaust port is defined by inclination of the outer-peripheral-side end surface of the inner ring member and inclination of the inner-peripheral-side end surface of the outer ring member.

3. A laser welding apparatus according to claim 1, wherein when a center of a circle, defined by the exhaust port, is set as an exhaust reference point, and a straight line passing the exhaust reference point and perpendicularly crossing the circle, is set as an exhaust axis, the exhaust direction of the gas is defined in such a manner that a gas focus point is set at a position which is on the exhaust axis and is distant downward from the exhaust reference point by a distance shorter than half a focus distance of the laser beam, and the gas exhausted from the exhaust port is focused on the gas focus point.

4. A laser welding apparatus according to claim 1, wherein the inner ring member and the outer ring member are detachably attached to the housing.

5. A laser welding apparatus according to claim 1, wherein
- a plurality of gas supply ports are formed on an outer peripheral side of the housing,
- the gas supply ports communicate with the cavity, and allow gas which is supplied from the gas supply source, to flow into the cavity, and
- the plurality of gas supply ports are arranged at equal intervals in a circumferential direction of the housing.

* * * * *